United States Patent
Karaoguz et al.

(10) Patent No.: US 7,853,255 B2
(45) Date of Patent: Dec. 14, 2010

(54) DIGITAL PERSONAL ASSISTANCE VIA A BROADBAND ACCESS GATEWAY

(75) Inventors: Jeyhan Karaoguz, Irvine, CA (US);
Marc Abrams, Aliso Viejo, CA (US);
Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1171 days.

(21) Appl. No.: 11/095,639

(22) Filed: Mar. 30, 2005

(65) Prior Publication Data

US 2005/0233743 A1 Oct. 20, 2005

Related U.S. Application Data

(60) Provisional application No. 60/563,894, filed on Apr. 16, 2004.

(51) Int. Cl.
*H04W 4/00* (2009.01)
(52) U.S. Cl. ............. 455/432.3; 370/338; 370/401; 370/352; 370/328; 455/417; 455/445; 455/3.01
(58) Field of Classification Search ............. 455/41.2, 455/41.3, 414.1
See application file for complete search history.

(56) References Cited

U.S. PATENT DOCUMENTS

| | | | |
|---|---|---|---|
| 6,275,863 B1 * | 8/2001 | Leff et al. ............ 709/248 |
| 6,434,159 B1 * | 8/2002 | Woodward et al. ....... 370/401 |
| 6,564,056 B1 * | 5/2003 | Fitzgerald ............ 455/435.1 |
| 6,891,807 B2 * | 5/2005 | Roskind et al. .......... 370/255 |
| 7,072,945 B1 * | 7/2006 | Nieminen et al. ........ 709/217 |
| 7,096,011 B2 * | 8/2006 | Kanazawa et al. ........ 455/421 |
| 7,194,251 B2 * | 3/2007 | Rubinstein et al. ....... 455/410 |
| 7,483,964 B1 * | 1/2009 | Jackson et al. .......... 709/221 |

* cited by examiner

*Primary Examiner*—Ajit Patel
(74) *Attorney, Agent, or Firm*—McAndrews, Held & Malloy, Ltd.

(57) ABSTRACT

A system and method supporting access, coordination, modification, updating, and management of multiple sources of multimedia information resident on a plurality of access devices is disclosed. A broadband access gateway may support applications that perform user services involving multiple sources of multimedia information across a network by acting as a focal point for access to multimedia information related to the applications. Using information that identifies such sources, the broadband access gateway may coordinate modification of one or more multimedia information sources based upon the content of other related sources of multimedia information. One such application may include the coordination of calendars for the planning of a meeting involving multiple participants. A representative embodiment of the present invention may identify available meeting dates and times, and the placement of reservations for appropriate travel accommodations using services accessible to the broadband access gateway via a broadband network.

52 Claims, 9 Drawing Sheets

DIGITAL PERSONAL ASSISTANCE VIA A BROADBAND ACCESS GATEWAY

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

The present application also makes reference to U.S. patent application Ser. No. 11/095,191, entitled "Location Based Directories Via A Broadband Access Gateway", filed Mar. 30, 2005, the complete subject matter of which is hereby incorporated herein by reference, in its entirety.

The present application also makes reference to U.S. patent application Ser. No. 11/095,188, entitled "Location-Aware Application Based Quality of Service (QoS) Via A Broadband Access Gateway", filed Mar. 30, 2005, the complete subject matter of which is hereby incorporated herein by reference, in its entirety.

The present application also makes reference to U.S. patent application Ser. No. 11/095,376, entitled "Enhanced Caller ID Information Based On Access Device Information Via A Broadband Access Gateway", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and cellular phones, to name only a few. A majority of these devices produce and/or store digital information related to the people and interactions that are a part of the life of the owner. Additional multimedia information sources may be accessible via, for example, the Internet.

Many of the sources of multimedia information may be of interest to a number of people. For example, a calendar or phonebook belonging to one individual may be of interest to others, who may wish to make changes while coordinating schedules. Some multimedia information sources are related to subjects of interest to large numbers of people including, for example, hobbies, political and sports personalities, sports teams, travel, and the like. Although at any point in time large numbers of users may be accessing any particular information source, each does so without knowledge of the others. Individuals with particular hobbies and interests must, in general, seek out others with similar interests by actively searching for forums, chat rooms, web logs, and similar communications tools.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method supporting digital personal assistance functionality for a plurality of access devices, substantially as shown in and/or described in connection with at least one of the figures, as set forth more completely in the claims.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to providing digital personal assistance functionality via a broadband access gateway. The digital personal assistance functionality may support the use of a single user interface to access multiple information sources, permitting the coordinated use and management of information of different types by a variety of access devices. The digital personal assistance functionality may be supported by a broadband access gateway that permits broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
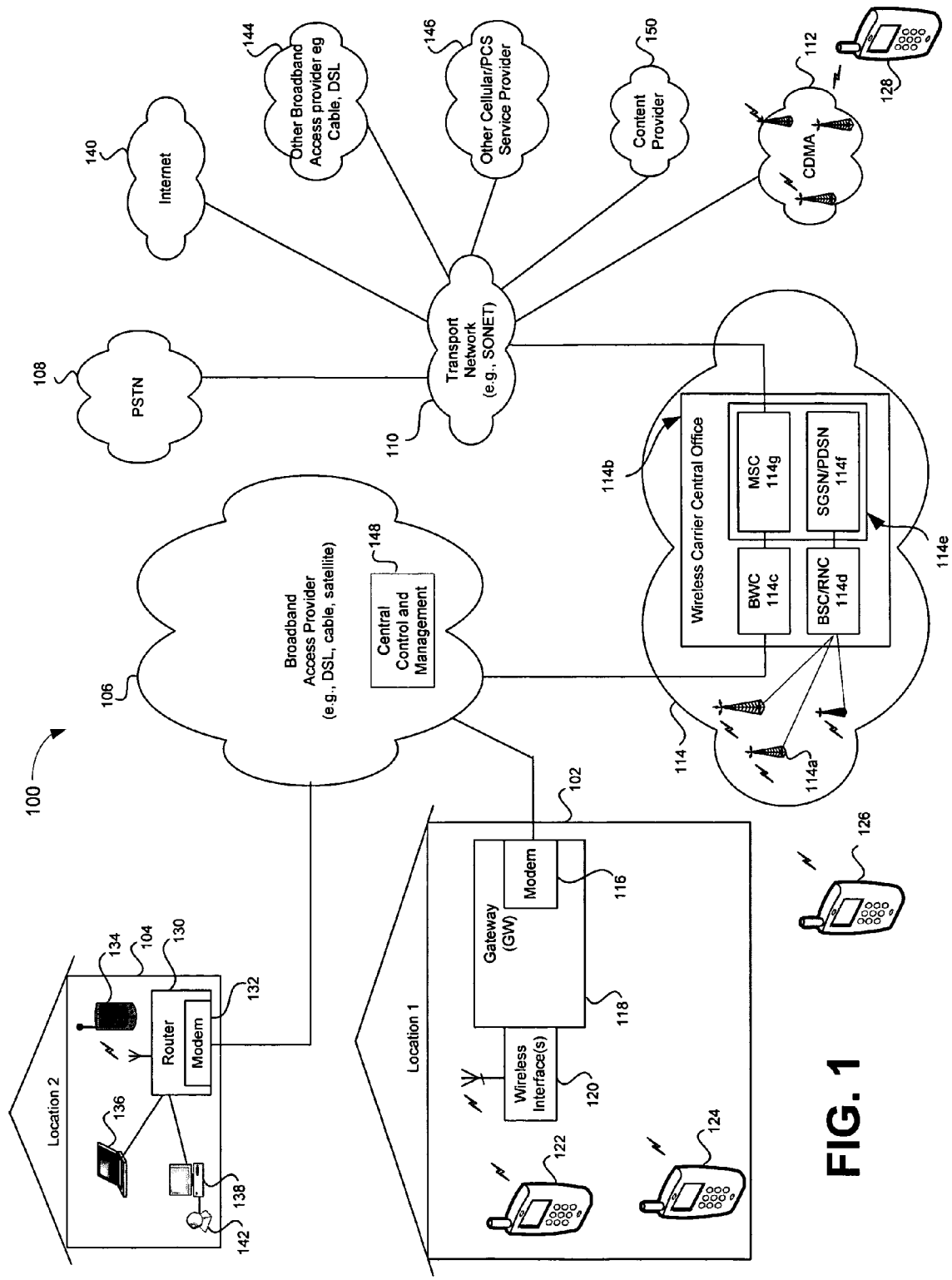
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114*a* in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114*a* in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
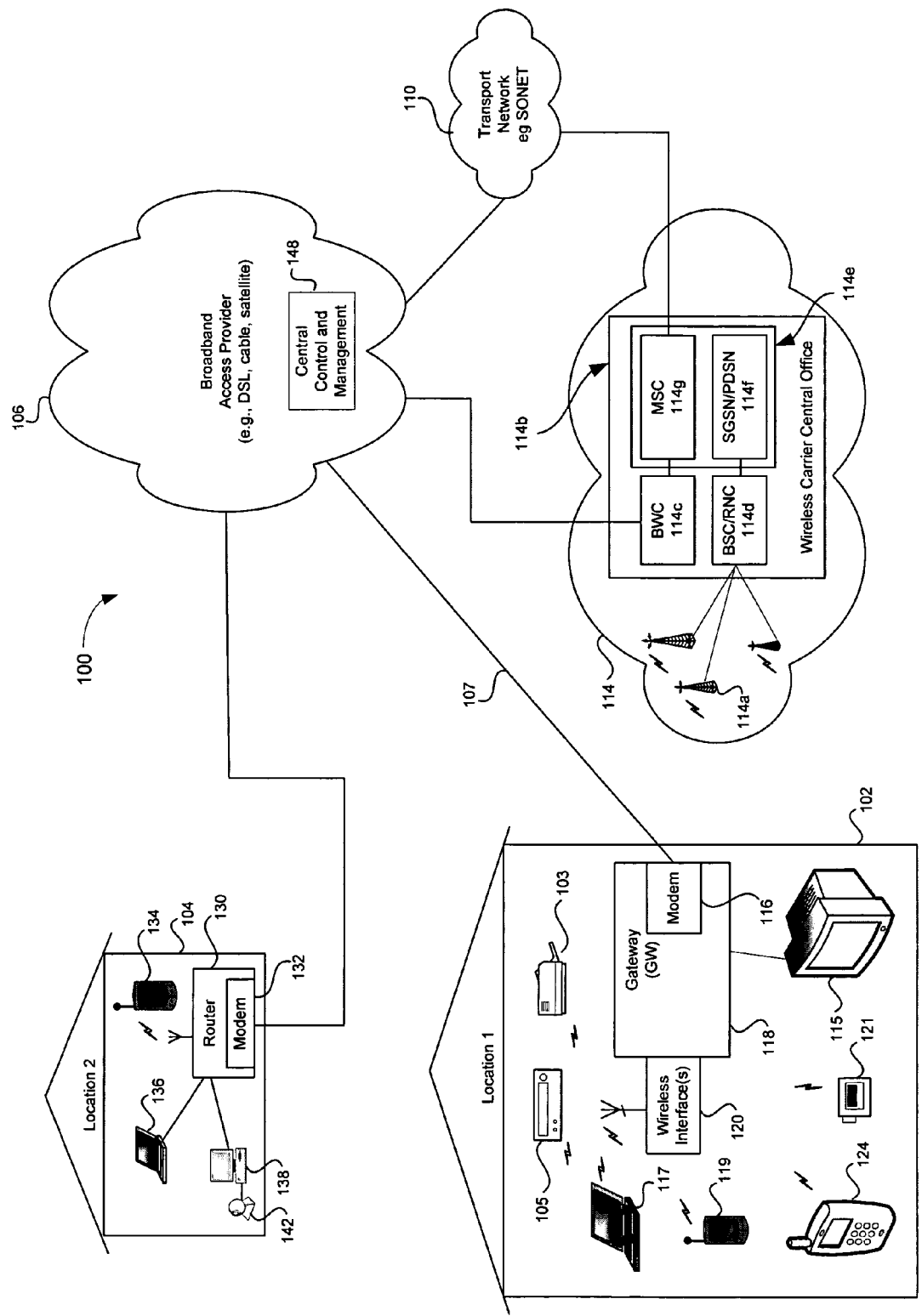
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11 a, b, g, and/or n interface, and/or an IEEE 802.15.3a ultra-wideband interface. Although the following discussion refers frequently to the capabilities and actions of the gateway 118 and wireless interface 120, the same may be said of the router 130 with modem 132 of FIGS. 1 and 2, for example, without departing from the spirit and scope of the present invention.

In accordance with a representative embodiment of the present invention, a wireless access device such as access device 124 may be mobile, and may move between the personal area network/wireless wide area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network/wireless local area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/021,294, entitled "Method And System For Providing Registration, Authentication, And Access Via A Broadband Access Gateway", filed Dec. 23, 2004, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842, entitled "Registering Access Device Multimedia Content Via A Broadband Access Gateway", filed Mar. 30, 2005 the complete subject matter of which is hereby incorporated herein by reference, in its entirety.

Figure 3A:
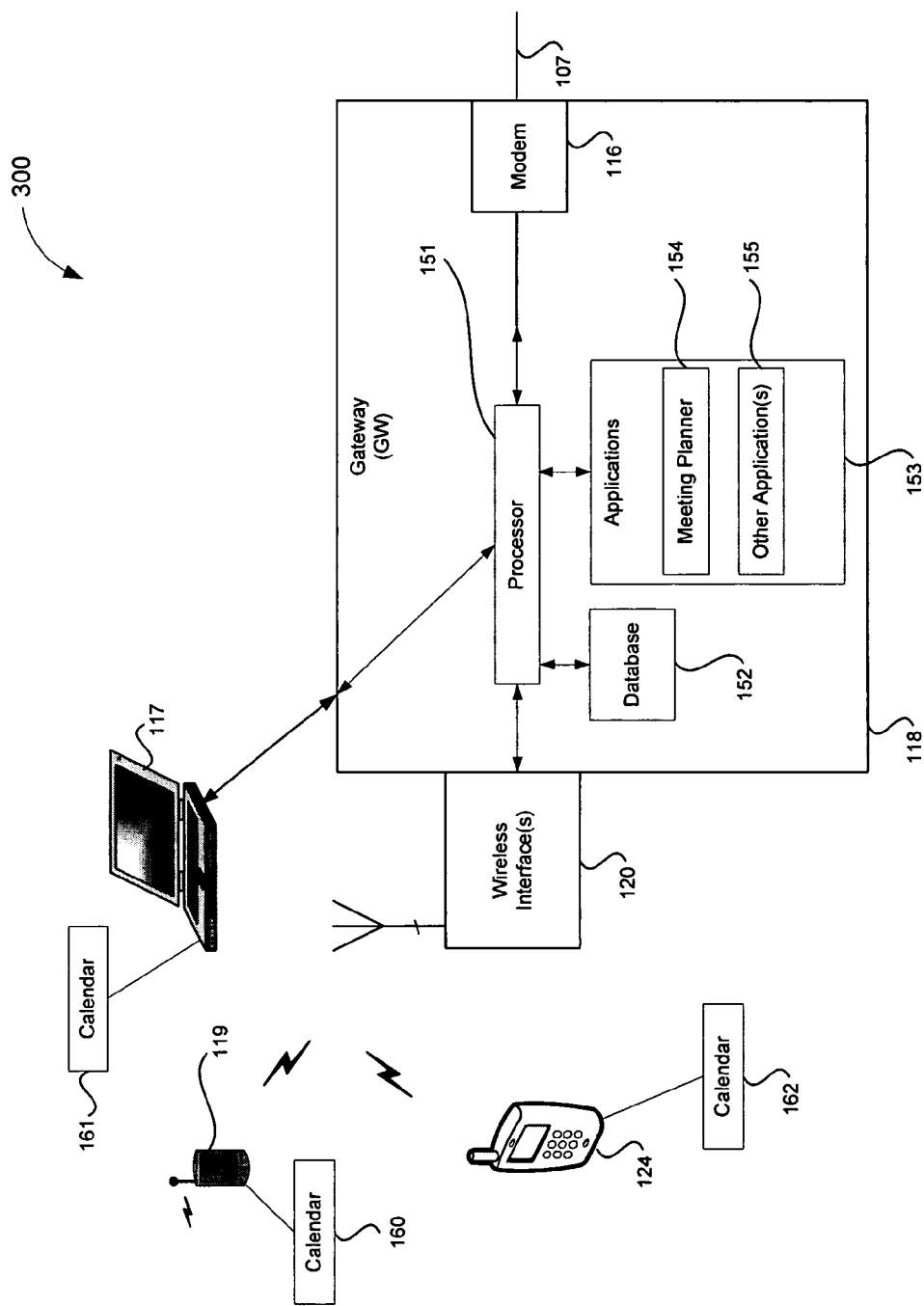
FIG. 3A shows a block diagram illustrating greater detail of an exemplary communication system that may correspond, for example, to a portion of the communication system of FIG. 2, that supports digital personal assistance functionality, in accordance with a representative embodiment of the present invention.

FIG. 3A shows a block diagram illustrating greater detail of an exemplary communication system 300 that may correspond, for example, to a portion of the communication system 100 of FIG. 2, that supports digital personal assistance functionality, in accordance with a representative embodiment of the present invention. The communication system 300 of FIG. 3A comprises a gateway 118 communicatively coupled to a wireless interface 120, a modem 116, and a laptop 117. The wireless interface 120, the modem 116, and the laptop 117 may correspond, for example, to the wireless interface 120, the modem 116, and the laptop 117 of FIG. 2. The modem 116 provides the gateway 118 with access to a broadband connection 107 that may, for example, comprise a digital subscriber line (DSL) connection, a cable network connection, a satellite connection, a T1 or T3 network connection, or similar broadband communication link. As shown in FIG. 3A, the wireless interface 120 is communicatively coupled to access device 124, that may correspond, for example, to the access device 124 of FIG. 2. The wireless interface 120 is also shown in communication with the wireless PDA 119. The wireless interface 120 may comprise any combination of interfaces such as, for example, a Bluetooth interface, an IEEE 802.11 a, b, g and/or n interfaces, and/or an IEEE 802.15.3a ultra-wideband interface.

As shown in the illustration of FIG. 3A, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118. The information resident in the database 152 of gateway 118 may be collected, for example, either at start of communication of an access device with the gateway 118, or periodically during the period while an access devices is in communication with the gateway 118. In addition to the database 152, the processor 151 of FIG. 3A also has access to a number of applications 153 such as, for example, a meeting planner application 154, and other applications 155 that may represent, for example, any software application supporting management of multiple multimedia information sources resident on any of the access device described above.

In a representative embodiment of the present invention, a broadband access gateway such as, for example, the gateway 118 of FIG. 2 or 3A, or the router 130 of FIG. 2, may function as a personal digital assistant for any of the access devices with which it is in communication. The digital personal assistance functionality of the gateway 118 represented by the meeting planner application 154 may access multimedia information sources such as, for example, the calendar information 161 residing on the laptop 117, the calendar information 160 residing on the wireless PDA 119, and the calendar information 162 residing on the access device 124. The meeting planner application 154 of FIG. 3A may, for example, access, manage, and modify the contents of the calendar information 161 of the laptop 117, the calendar information 160 of the wireless PDA 119, and the calendar information 162 of the access device 124 in order to make meeting arrangements at the request of the users of any of the access devices in communication with the gateway 118. Although the illustration of FIG. 3A shows a representation of multimedia information comprising calendar information, a representative embodiment of the present invention is not limited in this regard. Other forms of multimedia information may be accessed, managed, and modified by the applications 153 on the gateway 118 including, for example, phonebook information, still and video image information, slide presentations, documents, and the like, from any access device in communication with the gateway 118 such as, for example, access device 124 and laptop 117 of FIG. 3A. In addition, a representative embodiment of the present invention may also be capable of accessing multimedia information resident on access devices not directly in communication with the personal area network/wireless local area network supported by the wired and wireless interfaces of the gateway 118 such as, for example, access devices accessible via the broadband connection 107.

Figure 3B:
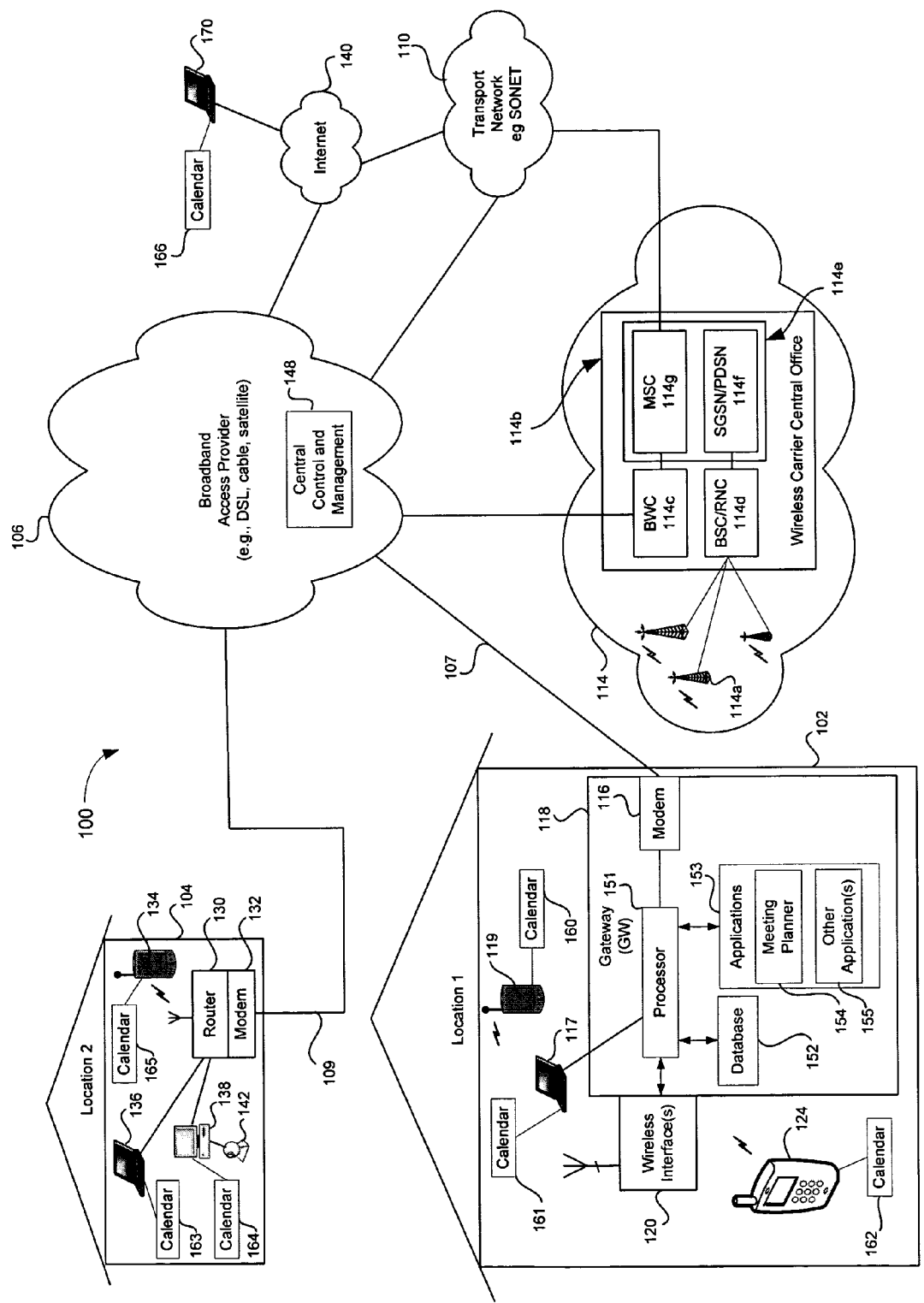
FIG. 3B shows a block diagram illustrating of another exemplary communication system that may correspond, for example, to the communication system of FIG. 2, that supports digital personal assistance functionality for access devices outside of the coverage area of the personal area network supported by the wireless interface of the gateway, in accordance with a representative embodiment of the present invention.

FIG. 3B shows a block diagram illustrating of another exemplary communication system 300 that may correspond, for example, to the communication system 100 of FIG. 2, that supports digital personal assistance functionality for access devices outside of the coverage area of the personal area network/wireless local area network supported by the wireless interface 120 of the gateway 118, in accordance with a representative embodiment of the present invention. The communication system 300 of FIG. 3B comprises a gateway 118 communicatively coupled to a wireless interface 120, a modem 116, and a laptop 117, at a first location 102. The wireless interface 120, the modem 116, and the laptop 117 may correspond, for example, to the wireless interface 120, the modem 116, and the laptop 117 of FIGS. 2 and 3A. The modem 116 may provide the gateway 118 with access to a broadband connection 107 that may, for example, comprise a digital subscriber line (DSL) connection, a cable network connection, a satellite connection, a T1 or T3 network connection, or similar broadband communication link to a broadband access provider (BAP) 106. As shown in FIG. 3B, the wireless interface 120 is communicatively coupled to access device 124 that may correspond, for example, to the access device 124 of FIG. 2. The wireless interface 120 is also shown in communication with the wireless PDA 119. The wireless interface 120 may comprise any combination of interfaces such as, for example, a Bluetooth interface, an IEEE 802.11 a, b, g and/or n interface, and/or an IEEE 802.15.3a ultra-wideband interface. The access device 124 may be capable of receiving service via either or both of the wireless interface 120 and the GSM network 114.

In addition to the gateway 118 at location 102, the communication system 300 of FIG. 3B comprises a router 130 with modem 132 at a second location 104. The modem 132 interfaces via a communication link 109 to BAP 106. The communication link 109 may comprise, for example, a digital subscriber line (DSL) connection, a cable network connection, a satellite connection, a T1 or T3 network connection, or similar broadband communication link. As shown in FIG. 3B, the router 130 is in communication via a wired connection to a laptop 136 and a personal computer (PC) 138 having digital camera 142. The router 130 is also in communication with the wireless personal digital assistant (PDA) 134 via a wireless link that may comprise any combination of wireless interfaces such as, for example, a Bluetooth interface, an IEEE 802.11 a, b, g and/or n interface, and/or an IEEE 802.15.3a ultra-wideband interface. The laptop 136, the PC 138, and the wireless PDA 134 have accessible to them calendar information 163, 164, 165, respectively.

The communication system 300 of FIG. 3B also comprises a laptop 170, communicatively coupled to the gateway 118 at location 102 via the Internet 140 and the broadband access provider BAP 106. Calendar information 166 resides with and is accessible to the laptop 170. The GSM network 114 is communicatively coupled to the BAP 106 (and, therefore, Internet 140 and gateway 118) via transport network 110.

As shown in the illustration of FIG. 3B, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118. The information resident in the database 152 of gateway 118 may be collected, for example, either at start of communication of an access device such as, for example, the access device 124, the wireless PDA 119, and the laptop 117 with the gateway 118, or periodically during the period while an access devices is in communication with the gateway 118. In addition to the database 152, the processor 151 of FIG. 3B also has access to a number of applications 153 such as, for example, a meeting planner application 154, and other applications 155 that may represent, for example, any software application supporting management of multiple multimedia information sources resident on any of the access device described above.

In a representative embodiment of the present invention, an access device such as, for example, the laptop 170 that is not within the coverage area of the wireless interface 120 of the gateway 118, and not in direct wired communication with the gateway 118, as is the case, for example, with the laptop 117, may initiate or may be accessed as part of the actions of the applications 153 present on the gateway 118. Any of the access devices shown in the communication system 300 of FIG. 3B may, for example, initiate a meeting planning activity using the meeting planner application 154 resident on the gateway 118. Such meeting planning activities may, for example, involve the calendar information of any of the access devices shown in FIG. 3B such as, for example, the calendar information 161 of laptop 117, the calendar information 162 of access device 124, and the calendar information 164 of PC 138. Information about the location of multimedia information relevant to the meeting planning activities of the meeting planner application 154 may be stored within the database 152 of the gateway 118, having been provided by a user of an access device, discovered by searching activities of the gateway 118, or automatically provided by an access device to the gateway 118 while in communication with the gateway 118.

Figure 3C:
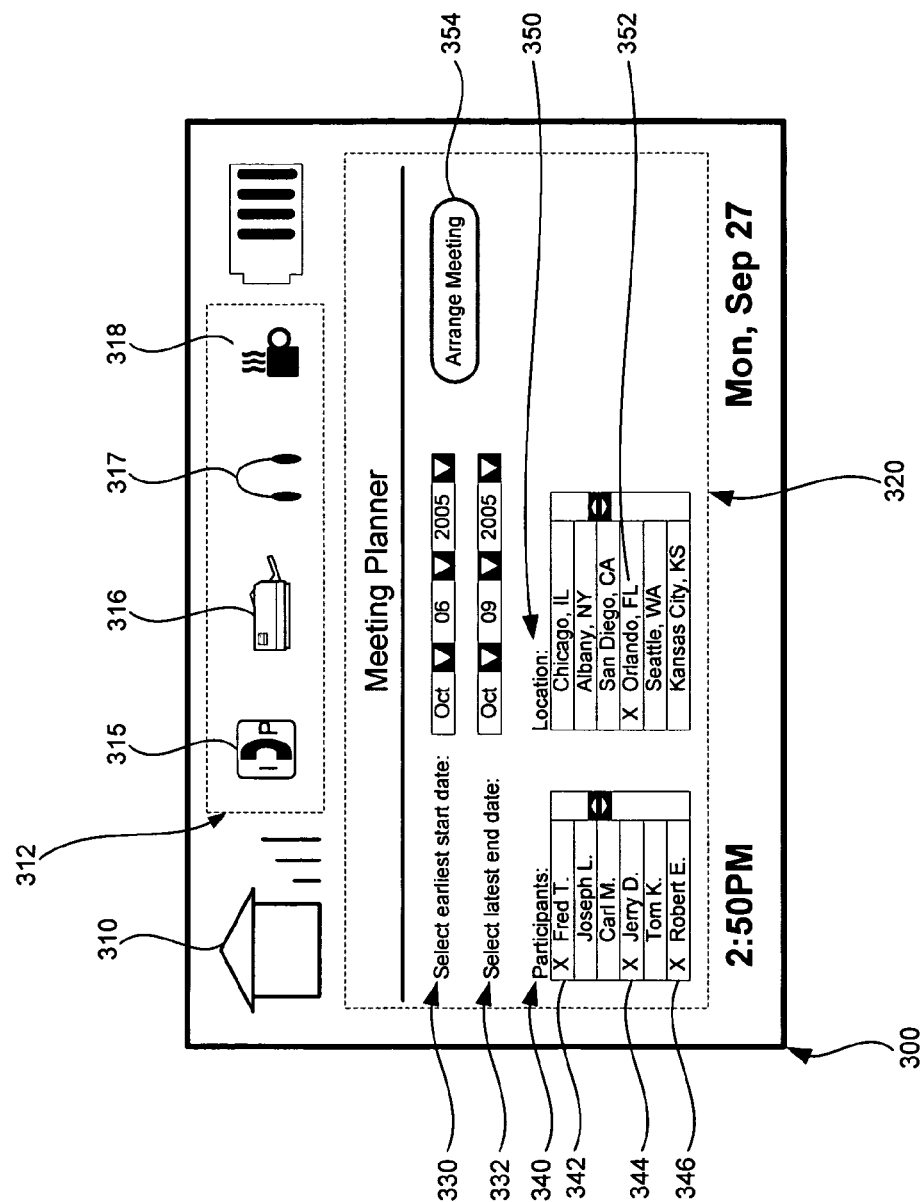
FIG. 3C shows an illustration of an exemplary meeting planner screen that may be displayed on an access device such as, for example, the access device of FIG. 3B upon activation of a meeting planner application such as, for example, the meeting planner application of FIG. 3B, in accordance with a representative embodiment of the present invention.

FIG. 3C shows an illustration of an exemplary meeting planner screen 320 that may be displayed on an access device such as, for example, the access device 124 of FIG. 3B upon activation of a meeting planner application such as, for example, the meeting planner application 154 of FIG. 3B, in accordance with a representative embodiment of the present invention. The display 300 may, for example, correspond to a display of an access device in communication with a broadband access gateway supporting personal digital assistant functionality such as, for example, the gateway 118 or the router 130 of FIG. 3B. As shown in FIG. 3C, the display 300 comprises a network indicator 310, a network services indicator area 312, a battery life indicator, a time of day indicator, and a day and date indicator. The display 300 also comprises a display area 320 to allow an access device to present graphical or textual information for a variety of reasons and from a number of sources. The access device having the display 300 of FIG. 3C may, for example, correspond to an access device of a user desiring to plan a meeting involving multiple participants in several locations. The user of the access device may have activated the meeting planner application 154 by selecting an icon such as, for example, the meeting planner icon 318 shown in FIG. 3C.

In the illustration of FIG. 3C, the display area 320 shows a meeting planner screen 320 comprising a graphical interface with a earliest start date selection tool 330, a latest end date selection tool 332, a participant selection tool 340, and a location selection tool 350. The earliest start date selection tool 330 may be used to indicate the earliest date on which the meeting may start, and the latest end date selection tool 332 the latest date on which the meeting may end. The participant selection tool 340 may comprise a number of potential participants, including the three participants 342, 344, 346 shown in FIG. 3C that have been selected for the meeting being scheduled. The list of potential participants of the participant selection tool 340 may be derived from, for example, the database 152 of FIG. 3B, or may be entered by the user of the access device. The identification of the selected participants 342, 344, 346 permits the meeting planner application 154 to access, for example, the calendar information of the selected participants 342, 344, 346 during the meeting planning process. The location selection tool 450 may comprise a number of potential meeting locations, including the selected location 352 shown in FIG. 3C. The list of potential meeting location of the location selection tool 350 may be derived from, for example, the database 152 of FIG. 3B, or may be entered by the user of the access device. The user may request that the meeting arrangements be made by selecting the arrange meeting button 354. A meeting planner application according to a representative embodiment of the present invention may then search the meeting-related multimedia information of the identified participants (e.g., calendar information, budget limitations, etc.) for common workable dates for the desired meeting. The meeting planner application may also access services related to the scheduling of hotel rooms and transportation (e.g., rental cars, airline seats, transfers, etc.), that are accessible via a broadband access gateway such as, for example, the gateway 118 or the router 130 of FIG. 3A, 3B, in order to arrange other services for the identified participants within the identified earliest start date and latest end date interval. Although the above example describes some of the function of a meeting planner application, the present invention is not limited only to the planning of meetings, but may have application in any application where access, modification, updating, and coordination of multiple sources of multimedia information may be desired.

Figure 3D:
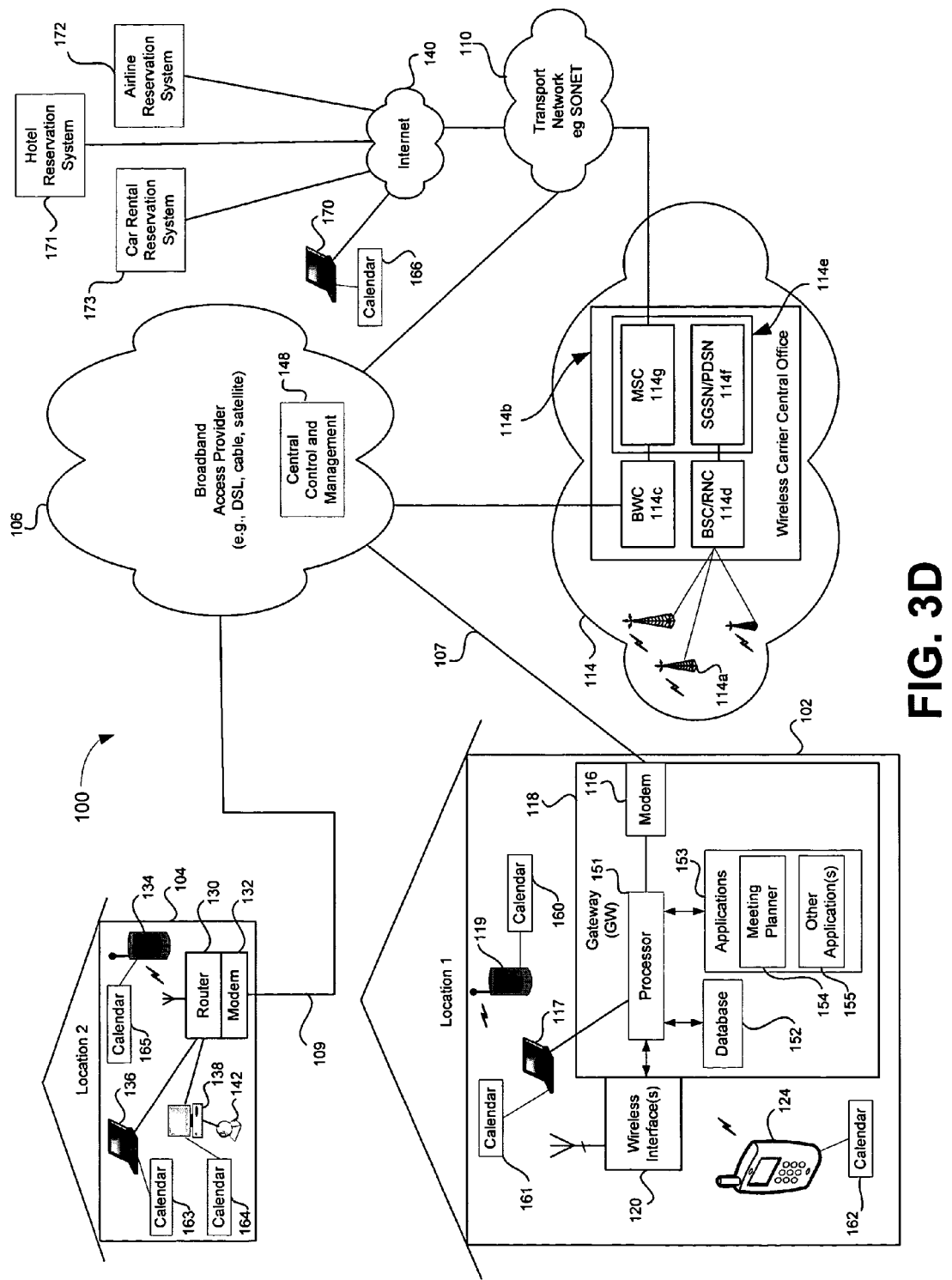
FIG. 3D shows a block diagram illustrating of an exemplary communication system that may correspond, for example, to the communication system of FIG. 2, that supports access to functions and/or services by the digital personal assistance functionality by access devices supported by the gateway or the router of FIG. 2, in accordance with a representative embodiment of the present invention.

FIG. 3D shows a block diagram illustrating of an exemplary communication system 300 that may correspond, for example, to the communication system 100 of FIG. 2, that supports access to functions and/or services by the digital personal assistance functionality by access devices supported by the gateway 118 or the router 130 of FIG. 2, in accordance with a representative embodiment of the present invention. The communication system 300 of FIG. 3D comprises a gateway 118 communicatively coupled to a wireless interface 120, a modem 116, and a laptop 117, at a first location 102. The wireless interface 120, the modem 116, and the laptop 117 may correspond, for example, to the wireless interface 120, the modem 116, and the laptop 117 of FIG. 2. The modem 116 may provide the gateway 118 with access to a broadband connection 107 that may, for example, comprise a digital subscriber line (DSL) connection, a cable network connection, a satellite connection, a T1 or T3 network connection, or similar broadband communication link to a broadband access provider (BAP) 106. As shown in FIG. 3D, the wireless interface 120 is communicatively coupled to access device 124 that may correspond, for example, to the access device 124 of FIG. 2. The wireless interface 120 is also shown in communication with the wireless PDA 119. The wireless interface 120 may comprise any combination of interfaces such as, for example, a Bluetooth interface, an IEEE 802.11 a, b, g and/or n interface, and/or an IEEE 802.15.3a ultra-wideband interface. The access device 124 may be capable of receiving service via either or both of the wireless interface 120 and the GSM network 114.

In addition, the communication system 300 of FIG. 3D comprises a router 130 with modem 132, at a second location 104. The modem 132 interfaces via a communication link 109 to BAP 106. The communication link 109 may comprise, for example, comprise a digital subscriber line (DSL) connection, a cable network connection, a satellite connection, a T1 or T3 network connection, or similar broadband communication link. As shown in FIG. 3D, the router 130 is in communication via a wired connection to a laptop 136 and a personal computer (PC) 138 having digital camera 142. The router 130 is in communication with the wireless personal digital assistant (PDA) 134 via a wireless link that may comprise any combination of wireless interfaces such as, for example, a Bluetooth interface, an IEEE 802.11 a, b, g and/or n interface, and/or an IEEE 802.15.3a ultra-wideband interface. The laptop 136, the PC 138, and the wireless PDA 134 have accessible to them calendar information 163, 164, 165, respectively. The communication system 300 of FIG. 3D also comprises a laptop 170, communicatively coupled to the gateway 118 at location 102 via the Internet 140 and the BAP 106. Calendar information 166 resides with and is accessible to the laptop 170. The GSM network 114 is communicatively coupled to the BAP 106 (and, therefore, Internet 140 and gateway 118) via transport network 110.

As shown in the illustration of FIG. 3D, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118. The information resident in the database 152 of gateway 118 may be collected, for example, either at start of communication of an access device with the gateway 118, or periodically during the period while an access devices is in communication with the gateway 118. In addition to the database 152, the processor 151 of FIG. 3D also has access to a number of applications 153 such as, for example, a meeting planner application 154, and other applications 155 that may represent, for example, any software application supporting management of multiple multimedia information sources resident on any of the access device described above.

In addition to those elements described above, the communication system 300 of FIG. 3D is shown as comprising a hotel reservation system 171, an airline reservation system 172, and a car rental reservation system 173 that may be accessible to, for example, the access devices of the locations 102, 104 via the Internet 140, the transport network 110, and the BAP 106. Although the hotel reservation system 171, the airline reservation system 172, and the car rental reservation system 173 are shown in FIG. 3D as communicatively coupled to the Internet 140, this does not represent a limitation of the present invention. Services like the hotel reservation system 171, the airline reservation system 172, and the car rental reservation system 173 (or other similar type services) may also be communicatively coupled to other entities within the communication system 300 such as, for example, the transport network 110 and BAP 106, without departing from the spirit and scope of the present invention.

In a representative embodiment of the present invention, services such as, for example, the hotel reservation system 171, the airline reservation system 172, and the car rental reservation system 173 of FIG. 3D may be identified by a broadband access gateway such as, for example, the gateway 118 or the router 130 of FIG. 3D during a search for accessible multimedia information and services. Such services may also be identified by a user of an access device such as, for example, the access device 124, the wireless PDA 119, or the PC 138 of FIG. 3D. Services such as, for example, the hotel reservation system 171, the airline reservation system 172, and the car rental reservation system 173 may be accessed by digital personal assistance applications such as, for example, one or more of the applications 153 of FIG. 3D in order to fulfill the function of the applications 153. For example, a user of an access device such as, for example, the wireless PDA 119 at location 102 or laptop 136 at location 104 may desire to arrange a meeting with a user of the laptop 170 at a particular location. The meeting planner application 154 may determine a set of mutually agreeable dates by using the calendar information 160 of the user of wireless PDA 119, and the calendar information 166 of the user of the laptop 170. The meeting planner application 154 may also base meeting arrangements upon availability information acquired from, for example, the airline reservation system 172, the hotel reservation system 171, and the car reservation system 173. By automatically identifying dates on which, for example, a hotel room, an airline flight, a car, and the other participant(s) of a meeting are available, the meeting planner application 154 may provide personal digital assistant functions to aid users in scheduling business and personal meeting arrangements. Although an example of a meeting planning application has been described above, a representative embodiment of the present invention is not limited only to this particular type of application. Many other user activities may be supported by an appropriate one of the other applications 155, in accordance with an embodiment of the present invention.

In a representative embodiment of the present invention, an access device such as, for example, the laptop 170 that is not within the coverage area of the wireless interface 120 of the gateway 118, and not in direct wired communication with the gateway 118 as is the case, for example, with the laptop 117, may initiate digital personal assistance functionality of the applications 153, for example, or may be accessed as part of the actions of the applications 153 present on the gateway 118. Any of the access devices shown in the communication system 300 of FIG. 3D may, for example, initiate a meeting planning activity using the meeting planner application 154 resident on the gateway 118. Such meeting planning activities may, for example, involve the calendar information of any of the access devices shown in FIG. 3D such as, for example, the calendar information 161 of laptop 117, the calendar information 162 of access device 124, the calendar information 164 of PC 138, and the calendar information 166 of laptop 170. Information about the location of multimedia information relevant to the meeting planning activities of the meeting planner application 154 may be stored within the database 152 of the gateway 118, having been provided by a user of an access device, discovered by searching activities of the gateway 118, or automatically provided by an access device to the gateway 118 while in communication with the gateway 118. These capabilities also permit a representative embodiment of the present invention to access and modify multimedia information sources resident on access devices connected to, for example, the Internet 140, the other cellular/PCS service provider 146, and the CDMA network 112 shown in FIG. 2. It should be noted that although the descriptions regarding FIGS. 3A, 3B, 3D focus on examples using calendar information and the planning of meetings, representative embodiments of the present invention are equally applicable to other activities where access, maintenance, modification, or updating of one or more multimedia information sources residing at separate locations may be involved.

In a representative embodiment of the present invention, a user of an access device such as, for example, the access device 124 of FIG. 2, may wish to access a multimedia information source belonging to a coworker such as, for example, a calendar on the laptop 117 of FIG. 2, in order to schedule a meeting of mutual interest. In one representative embodiment of the present invention, the user may know the whereabouts of the calendar information of the coworker, and may provide that information to the gateway 118 using the access device 124. The user of the access device 124 may identify the multimedia information source to be accessed using information such as, for example, a name, a user identifier, a wired or wireless directory number, an electronic serial number, an internet protocol address, an administrative identifier, a media access control (MAC) address, a combination of the above, or another form of identifier. A calendar application resident on the gateway 118 may then access the calendar information of the coworker on the laptop 117, and the user of access device may view and update the calendar of the coworker. The laptop 117 and the gateway 118 may, for example, restrict access to the calendar information on the laptop 117 to users having appropriate authorization. Authorization may be determined by, for example, the gateway 118, using identity and authentication information of the access device 124 and the laptop 117.

In another representative embodiment according to the present invention, the user of the access device 124 may not know the whereabouts of, for example, the calendar information of the coworker, and may locate it using a database of multimedia information that is accessible via the gateway 118 such as, for example, the database 152 of FIG. 3D. Such a database of multimedia information sources accessible to a broadband access gateway such as gateway 118 is described briefly, above. Additional details of an exemplary database such as the database 152 are provided in U.S. patent application Ser. No. 11,095,191, entitled "Location Based Directories Via A Broadband Access Gateway", filed Mar. 30, 2005, the complete subject matter of which is hereby incorporated herein by reference, in its entirety.

In a representative embodiment of the present invention, the parameters used in a search of a database such as, for example, the database 152 may be provided by the user of an access device such as, for example, the access device 124 of FIG. 3D. For example, the user of the access device 124 may manually provide identifying information about the coworker to a search function (not shown) of the gateway 118. Parameters used in a search may also be provided by an application having digital personal assistance functionality such as, for example, the applications 153 of FIG. 3D.

In a representative embodiment in accordance with the present invention, the user of an access device such as, for example, the access device 124, wireless PDA 119, and laptop 117 of FIG. 3D may receive a call via a wireless network such as, for example, the GSM network 114 or a broadband network such as, for example, the broadband connection 107. The incoming call may be received, for example, when the access device is not currently engaged in a call, or it may be received during a previously established call. Information identifying the calling party, generally referred to as "caller ID" information, may be included in the messaging that notifies the access device 124 of the incoming call, or the caller ID information may be sent in separate messaging from, for example, the gateway 118, the router 130, or the GSM network 114. The call and the associated caller ID information may be received by an access device in communication with any of the networks of FIG. 1 such as, for example, the Internet 140, the CDMA network 112, the PSTN 108, and the other cellular/PCS service provider 146, without departing from the spirit and scope of the present invention. In a representative embodiment of the present invention, the call may originate from, for example, the GSM network 114, or any of the networks that are accessible via the network serving the called party. This also includes communication networks such as, for example, the PSTN 108, the CDMA network 112, and the other cellular/PCS service provider 146 shown in FIG. 1.

In a representative embodiment of the present invention, the parameters used in the search of a database such as, for example, the database 152 described above may, for example, be received by the gateway 118 in connection with an incoming or outgoing call. For example, the user of an access device such as, for example, the access device 124, the laptop 117, and the wireless PDA 119 may receive/place a call from/to a coworker, with the intention of scheduling an event or meeting. The gateway 118 serving the access device 124 may associate with the incoming or outgoing call, information that identifies the user of the access device 124 and the coworker originating or receiving the call. Such identifying information may be received by a broadband access gateway such as, for example, the gateway 118, from an access device such as, for example, the access device 124, in connection with the placement or receipt of a phone call. At some point during the call, the user of the access device 124 may, for example, wish to access the calendar information for the called and calling parties using, for example, a calendar application of the applications 153 of the gateway 118. The calendar application of the applications 153 may locate and access the calendar information for each party to the call using the information identifying the called and calling parties (i.e., caller ID information) that is received by the gateway 118. The calendar application of the applications 153 of the gateway 118 may enable the user of the access device 124 (or the other party to the call) to locate, access, and modify the calendars of the called and calling parties. Access to and modification of multimedia information such as, for example, the calendar information described above, may be subject to any permissions or authentication that the owner of the multimedia information may require.

Although the above example illustrates aspects of a representative embodiment of the present invention that are related to the coordination of calendar information, the present invention is not limited to supporting user management of only calendar-type multimedia information. An embodiment of the present invention is equally applicable to the manipulation and management of other forms of multimedia information such as, for example, phonebook information, financial records such as checking, savings, and credit card account information, still and video image information, slide presentations, meeting and travel information, and other types of digital information to which coordination or co-management may apply. In addition, although the previous example describes a call and the manipulation of multimedia information (i.e., calendar information) for two parties, a different number of participants may employ a representative embodiment of the present invention without departing from either the spirit or scope of the present invention.

In a representative embodiment of the present invention, a broadband access gateway such as, for example, the gateway 118 or the router 130 of FIG. 3D may comprise applications that access multiple source of multimedia information, in order to provide a more complete set of information to a user of an access device. The sources of multimedia information may be located on a number of different access devices within the communication system 300 of FIG. 3D. For example, a meeting planner application of a broadband access gateway such as, for example, the gateway 118 may be capable of accessing calendar information for a number of meeting participants, determining a common meeting time available on all participant calendars, and selecting a centrally-located meeting room using the business addresses of the participants. For example, the access devices of all of the meeting participants may be in communication with the gateway 118 via, for example, wired or wireless interfaces such as those linking the access device 124, the laptop 117, and the wireless PDA 119 to the gateway 118 of FIG. 3D. The gateway 118 may therefore have access to schedule or calendar information on the access devices of each of the participants. The personal digital assistant application on the gateway 118 may also be capable of employing applications resident outside of the gateway 118, to perform some tasks in the planning process. This may include, for example, any of the multimedia information and services accessible via a broadband network such as, for example, the broadband connection 107 of FIG. 3D. For example, in scheduling a room for a business meeting, or the hotel, car, and airline reservations of a travel itinerary, a representative embodiment of the present invention may employ active information sources or services outside of the gateway 118 such as, for example, a hotel room locator, a car rental company reservation system, and an airline reservation system that are accessible from, for example, the Internet 140 of FIG. 3D. Multimedia information on the access devices of meeting participants related to business expenses may also be updated to reflect the cost of any airline, hotel, car rental, and other accommodations that have been arranged.

In a representative embodiment of the present invention, the personal digital assistant functionality of the gateway 118 may be updatable via, for example, the wireless interface 120, a wired connection such as the connection to the laptop 117, and a broadband network such as, for example, the broadband connection 107. One or more of the applications 153 of FIG. 3D such as, for example, the meeting planner 154 or the other applications 155 may be updated, or new applications 153 may be added, to expand the digital personal assistance functionality of a broadband access gateway such as, for example, the gateway 118.

Figure 3E:
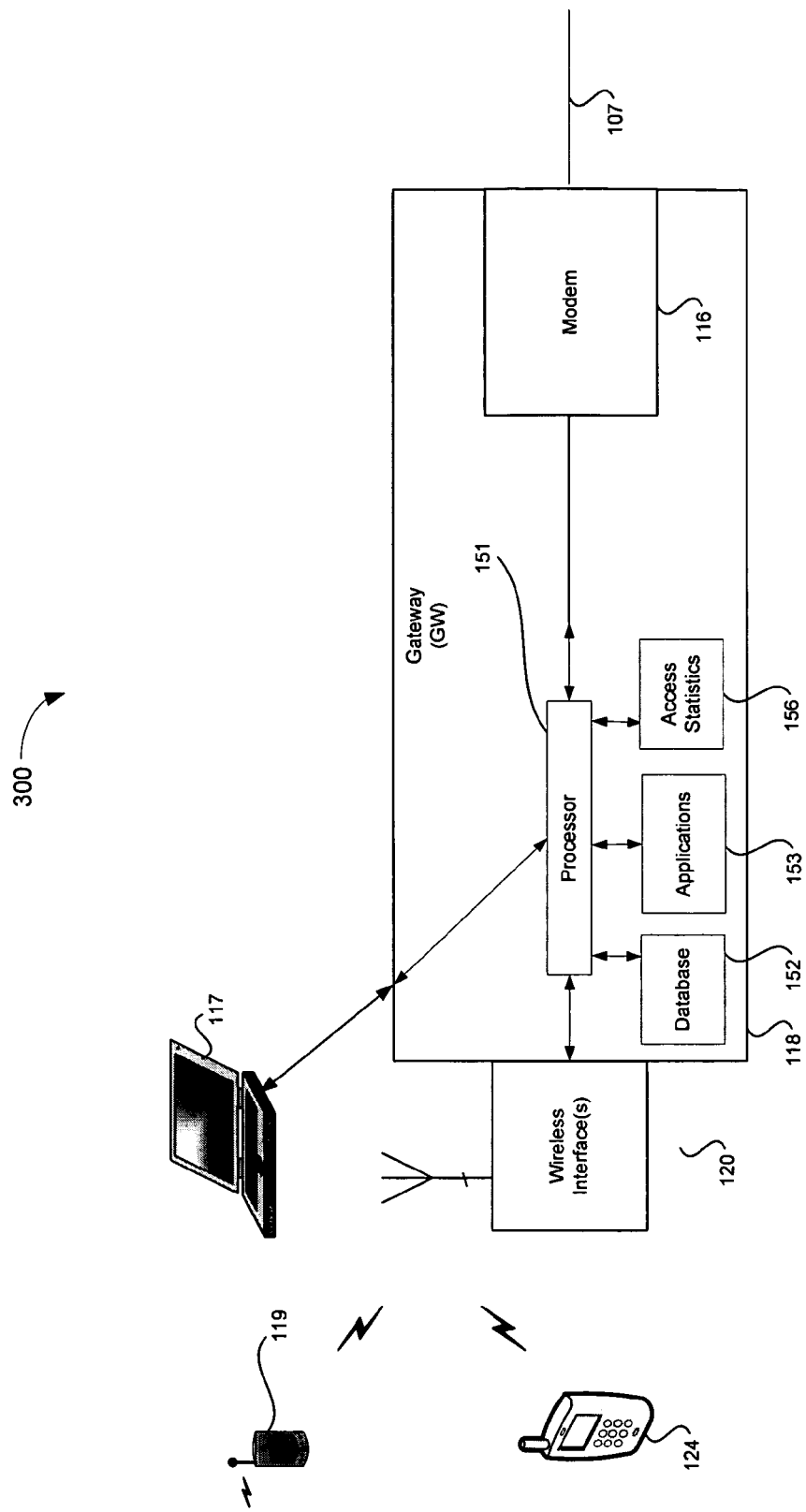
FIG. 3E shows a block diagram illustrating greater detail of an exemplary communication system that may correspond, for example, to a portion of the communication system of FIG. 2, that supports digital personal assistance functionality, in accordance with a representative embodiment of the present invention.

FIG. 3E shows a block diagram illustrating greater detail of an exemplary communication system 300 that may correspond, for example, to a portion of the communication system 100 of FIG. 2, that supports digital personal assistance functionality, in accordance with a representative embodiment of the present invention. As shown in FIG. 3E, the communication system 300 comprises a gateway 118 communicatively coupled to a wireless interface 120, a modem 116, and a laptop 117. The wireless interface 120, the modem 116, and the laptop 117 may correspond, for example, to the wireless interface 120, the modem 116, and the laptop 117 of FIG. 2. The modem 116 provides the gateway 118 with access to a broadband connection 107 that may, for example, comprise a digital subscriber line (DSL) connection, a cable network connection, a satellite connection, a T1 or T3 network connection, or similar broadband communication link. As shown in FIG. 3E, the wireless interface 120 is communicatively coupled to access device 124, that may correspond, for example, to the access device 124 of FIG. 2. The wireless interface 120 is also shown in communication with the wireless PDA 119. The wireless interface 120 may comprise any combination of interfaces such as, for example, a Bluetooth interface, an IEEE 802.11 a, b, g and/or n interface, and/or an IEEE 802.15.3a ultra-wideband interface.

As shown in the illustration of FIG. 3E, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118. The information resident in the database 152 of gateway 118 may be collected, for example, either at start of communication of an access device with the gateway 118, or periodically during the period while an access devices is in communication with the gateway 118. In addition to the database 152, the processor 151 of FIG. 3E also has access to a number of applications 153 that may correspond, for example, to applications such as the meeting planner application 154, and other applications 155 of FIG. 3D. The applications 153 may represent, for example, any software application supporting management of multiple multimedia information sources resident on any of the access device described above.

In a representative embodiment according to the present invention, a broadband access gateway such as, for example, the gateway 118 of FIG. 3E may track and coordinate accesses to multimedia information sources and services. For example, the gateway 118 may collect access statistics 156 of FIG. 3E for items in the database 152 of multimedia information sources, as described above. Based upon statistics such as, for example, number of accesses, accesses per unit time, duration of access or usage, and demographics of users accessing multimedia information and services, the gateway 118 may determine that a multimedia source or service warrants being identified as a "frequently accessed" multimedia information source or service. Information that may be used to identify and track the activity of users of access devices may comprise, for example, electronic serial numbers, Internet protocol (IP) addresses, media access control (MAC) addresses, International Mobile Station Identifier (IMSI) addresses, and Mobile Identification Number (MIN) addresses, to name only a few.

As previously described above, the information identifying an access device or a user may be sent by an access device such as, for example, the access device 124 to a broadband access gateway such as, for example, the gateway 118 at the beginning of and/or during communication of the access device 124 with the gateway 118. Information identifying an access device may comprise, for example, electronic serial numbers, Internet protocol (IP) addresses, media access control (MAC) addresses, International Mobile Station Identifier (IMSI) addresses, and Mobile Identification Number (MIN) addresses, while information identifying the user may comprise wired or wireless directory number, electronic serial number, internet protocol address, administrative identifier, media access control (MAC) address, and a digital certificate. Depending upon the identifying information, the user of an access device may be allowed to access and modify multimedia information or service. Permission to modify the multimedia information of another may be granted based upon the information identifying the one desiring access.

As described above, statistics and information identifying users or access devices related to accesses to particular sources of multimedia information and services may be collected and stored as in, for example, the access statistics 156 of FIG. 3E. Information such as, for example, the access statistics 156 may be used to determined a list of users that have a common interest. For example, those users accessing information about a particular sports team, calendar information for a particular individual, news on a particular subject, updates on a particular television program, plays for a particular video game, and information on English antiques may be identified as belonging to a group of users having a particular common interest. One or more thresholds may be used to differentiate between those users and/or access devices accessing multimedia information source or services infrequently or casually, and those making repeated and lengthy use of a multimedia information source or service. Those users and/or access devices with the greatest levels of access may be considered to have a higher probability of having a common interest in the multimedia information or service. Collected statistical information such as, for example, the access statistics 156 may be used to determine those users or access devices most probable to engage in future access.

In a representative embodiment of the present invention, users that have been found to have a high probability of having an interest in a particular multimedia information source or service may be automatically offered the opportunity to confirm or acknowledge that interest. If they so choose, they may allow their personal interest to be made public to others that have already confirmed or acknowledged an interest in the particular multimedia information source or service. Those electing to acknowledge an interest in the particular multimedia information source or service and to be associated with others that have acknowledged an interest in the particular multimedia information source or service may be added to a member list of those users that comprise a "social network". A broadband access gateway such as, for example, the gateway 118 of FIG. 3E may enable users of access devices such as, for example, the access device 124 and the laptop 117, to select those social networks in which they would like to participate, based on the subject matter or nature of the multimedia information of common interest. Participation may include notification of events related to the common interest, inclusion in group communication, automatic receipt of updates to multimedia information of interest, and related advertising, to name just a few examples. Users not yet identified as having a particular subject of interest may request to have their identity added to a member list of a social network for a particular area of common interest.

In one representative embodiment of the present invention, a user of an access device may disable the sharing of user-identifiable information, to avoid having their accesses to multimedia information sources tracked by a broadband access gateway such as, for example, the gateway 118 or the router 130 of FIG. 2. This may permit the user of an access device to maintain privacy over their access to multimedia information. In another representative embodiment according to the present invention, multimedia information sources may be accessed anonymously using a digital certificate that conveys authentication of the user while concealing the identity of the user.

Figure 4:
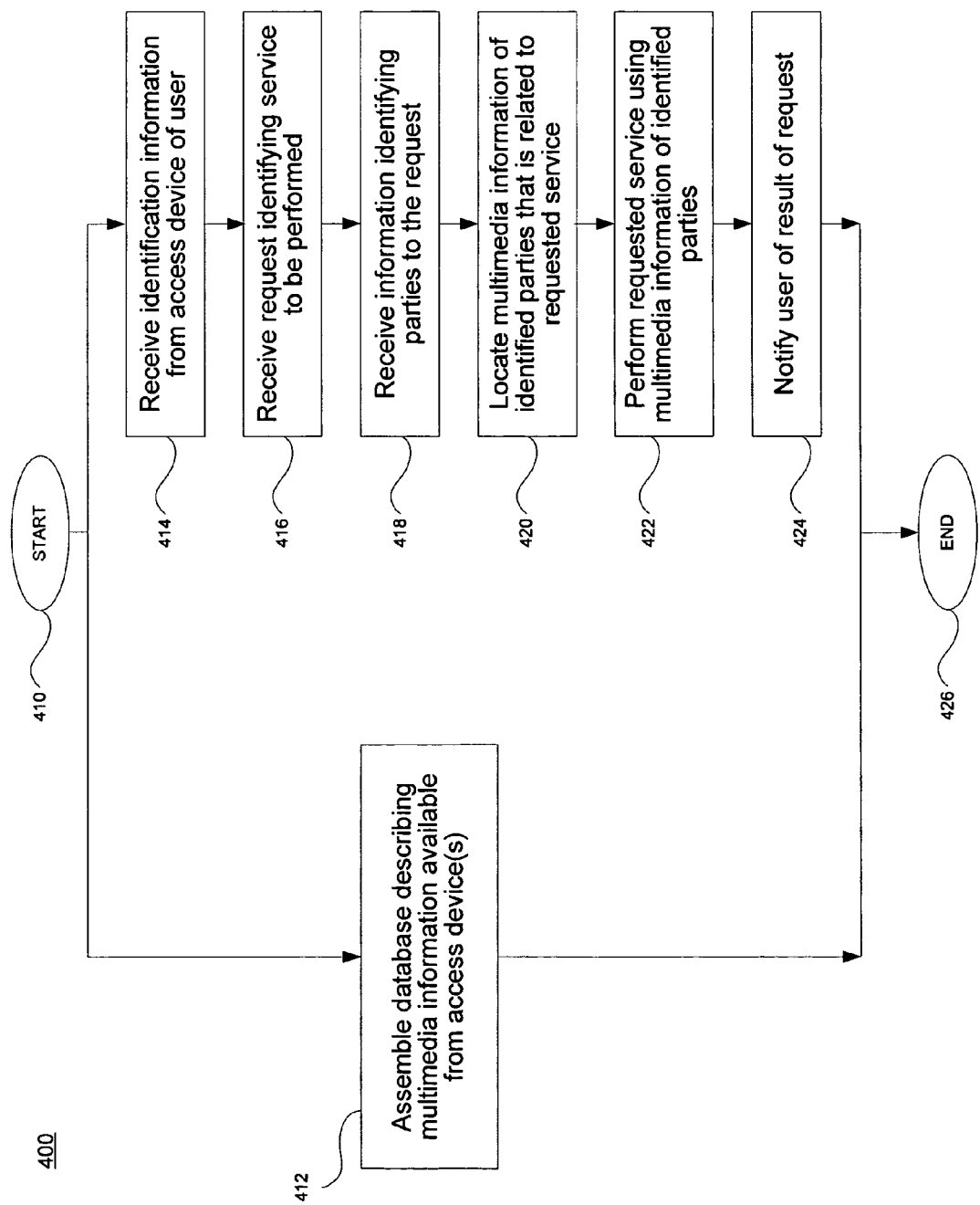
FIG. 4 is a flowchart of an exemplary method of providing digital personal assistance functionality via a broadband access gateway such as, for example, the gateway and the router of FIGS. 2, 3A, 3B, 3D, in accordance with a representative embodiment of the present invention.

FIG. 4 is a flowchart of an exemplary method of providing digital personal assistance functionality via a broadband access gateway such as, for example, the gateway 124 and the router 130 of FIGS. 2, 3A, 3B, 3D, in accordance with a representative embodiment of the present invention. The method of FIG. 4 is arranged as a left and a right path, representing that actions in those paths may be performed in parallel. The following discussion of FIG. 4 makes reference to elements of FIG. 2, as described above. The method of FIG. 4 begins at block 410, when a broadband access gateway such as, for example, the gateway 118 or the router of FIG. 2 is powered up. In the left path of FIG. 4, the broadband access gateway may assemble a database describing multimedia information that is available from access devices accessible to the gateway 118 (block 412). Such access devices may include, for example, the access device 124, the laptop 117, the wireless PDA 119, and the laptop 170 of FIGS. 3B and 3D. Although the action of block 412 of the flowchart of FIG. 4 are shown as occurring one time, this is not a limitation of the present invention, but rather a simplification made for reasons of clarity. The assembly of the database (block 412) may be an ongoing activity as access devices enter and leave communication with the broadband access gateway. The method of the left path of FIG. 4 then ends (block 412).

In the right path of the flowchart of FIG. 4, the method first receives identification information from the access device of a user (block 414). This may occur when the access device enters into communication with the broadband access gateway, or may occur periodically while the access device is served by the broadband access gateway. The broadband access gateway may then receive a request identifying a service desired by the user of the access device (block 416). This service may comprise, for example, the meeting planner service described above with respect to FIGS. 3B and 3D. The broadband access gateway may also receive information identifying the parties (i.e., the users of access devices) to the request (block 418). In the case of the meeting planner application described above, the parties may, for example, be the participants at the meeting being planned. Next, the broadband access gateway may locate multimedia information belonging to the identified parties, that is related to the requested service (e.g., calendar information for the meeting planner application) (block 420). Location of such information may employ a database of multimedia information accessible to the broadband access gateway such as, for example the database 152 of FIG. 3D, or may employ information provided by the user requesting the service. In the method of FIG. 4, the requested service is then performed employing the service-related multimedia information of the identified parties (block 422), such as, for example, the scheduling of a meeting. The user making the service request may then be notified of the results of the performance of the service (block 424). The method of the right path of FIG. 4 then ends (block 426).

Figure 5:
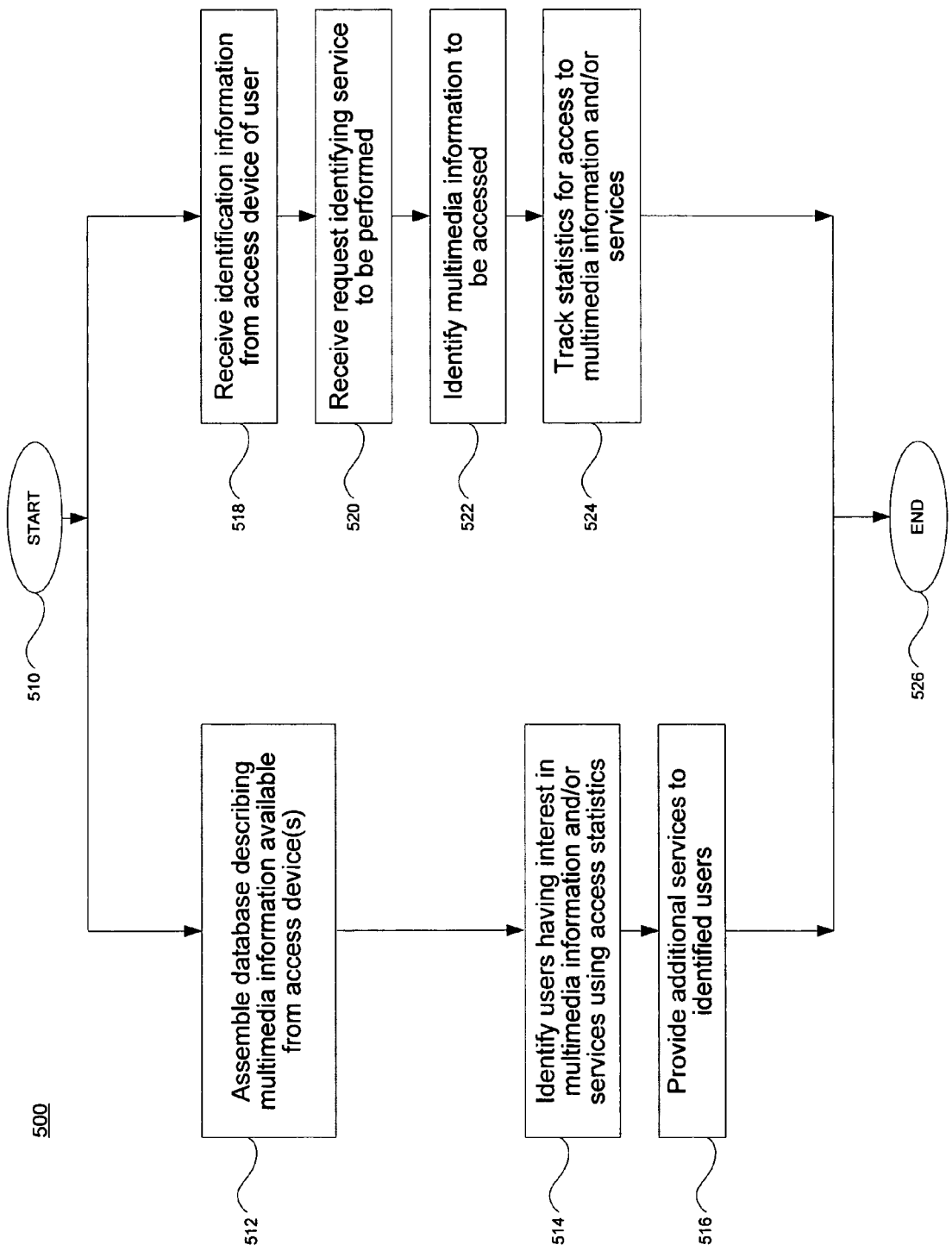
FIG. 5 is a flowchart of an exemplary method of tracking and identifying users of frequently accessed multimedia information or services, in accordance with a representative embodiment of the present invention.

FIG. 5 is a flowchart of an exemplary method of tracking and identifying users of frequently accessed multimedia information or services, in accordance with a representative embodiment of the present invention. The method of FIG. 5 is arranged as a left and a right path, representing that actions in those paths may be performed in parallel. The following discussion of FIG. 5 makes reference to elements of FIGS. 2, 3B, and 3D, as described above. The method of FIG. 5 begins at block 510, when a broadband access gateway such as, for example, the gateway 118 or the router of FIG. 2 is powered up. In the left path of FIG. 5, the broadband access gateway assembles a database describing multimedia information that is available from access devices accessible to a broadband access gateway (block 412). Such access devices may include, for example, the access device 124, the laptop 117, the wireless PDA 119, and the laptop 170 of FIGS. 3B and 3D. Although the action of block 512 of the flowchart of FIG. 4 are shown as occurring one time, this is not a limitation of the present invention, but rather a simplification made for reasons of clarity. The assembly of the database (block 512) may be an ongoing activity as access devices enter and leave communication with the broadband access gateway. The broadband access gateway may as part of the left path identify users having an interest in multimedia information and/or services using statistics that are acquired during activities of the right path of FIG. 5 (to be described, below) (block 514). The identification may employ one or more thresholds to determine and identify the relative interest in various sources of multimedia information and services that may be tracked. The broadband access gateway may then provide additional opportunities and services (e.g., provide access to additional services, notify the user of other sources similar to those already accessed, publish the names/identities of users with similar interests) to the identified users (block 516) based on the access statistics. The method of the left path of FIG. 5 then ends (block 412).

In the right path of the flowchart of FIG. 5, the method begins by receiving identification information from the access device of a user (block 518). This may occur when the access device enters into communication with the broadband access gateway, or may occur periodically while the access device is served by the broadband access gateway. The broadband access gateway may then receive a request identifying a service to be performed for the user of an access device (block 520). This service may comprise, for example, any of the broadband access gateway services described above, including multimedia access, exchange, playback, recording, cataloging, management, coordination, merging, storage, processing, and may include the meeting planner service described with respect to FIGS. 3B and 3D. The broadband access gateway may also receive information identifying or related to the multimedia information being accessed (i.e., the sources/owners/subject matter and other related metadata for accessed multimedia information) (block 522). Next, the broadband access gateway may track the access to multimedia information and/or services, maintaining a database or collection of access statistics for the various sources of multimedia information and services accessible via the broadband access gateway (block 524). The statistics tracked/collected by the actions of the right path of FIG. 5 may be used by the actions of the left path of the method of FIG. 5 (blocks 514 and 516) to provide additional opportunities and services to those users making frequent or repeated access to or use of multimedia information sources and services. As described briefly above, this may include the identification of "social networks" of users having common interests, the notification of those users of others having particular interests, providing opportunities for those users to interact, to contribute to an exchange on the subject of common interest, and to be made aware of and engage in new activities related to their interest. The method of the right path of FIG. 5 then ends (block 526).

Aspects of the present invention may be found in a system supporting digital personal assistance functionality for a plurality of access devices. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. In addition, the gateway may be capable of collecting, from at least a portion of the plurality of access devices, information describing available multimedia information. In a representative embodiment of the present invention, the gateway may be capable of receiving a request from one of the plurality of access devices. The request may identify at least one of: a service to be performed and at least two sources of multimedia information to be used in the performance of the service. The at least two sources of multimedia information may reside on different ones of the plurality of access devices, and the gateway may be capable of initiating the requested service using the identified at least two sources of multimedia information.

In various representative embodiments of the present invention, multimedia information may comprise at least one of: streaming video, broadcast video, voice, digital data, text, digitized audio, digitized still images, digitized video, and digitized music. The at least one wireless interface may be compliant with the Bluetooth V1.2 or compatible personal area network (PAN) specification, may communicate using an unlicensed frequency band, and may communicate at a frequency of approximately 2.4 gigahertz. In addition, the at least one wireless interface may be compliant with at least one of: the Institute of Electrical and Electronics Engineers (IEEE) 802.11a, 802.11b, 802.11g, and 802.11 n standards. In a representative embodiment according to the present invention, the broadband network may comprise at least one of: a digital subscriber line (DSL) network, a cable network, a satellite network, a cellular network, and the Internet. The cellular network may comprise at least one of: a global system for mobile communications (GSM) network, a time division multiple access (TDMA) network, a code division multiple access (CDMA) network, and a universal mobile telecommunications system (UMTS) network.

In a representative embodiment in accordance with the present invention, the gateway may be capable of receiving from at least one of the plurality of access devices, at least one of: information identifying an access device and information identifying a user. The information identifying an access device may comprise at least one of: an electronic serial number, an Internet protocol (IP) address, a media access control (MAC) address, a directory number, an International Mobile Station Identifier (IMSI) address, a Mobile Identification Number (MIN) address, information identifying a make of an access device, and information identifying a model of an access device. The information identifying a user may comprise at least one of: a member identifier, a user name, an administrative identifier, and a credit card number. In various representative embodiments of the present invention, the plurality of access devices may comprise at least one of: a mobile multimedia handset, a personal digital assistant (PDA), a personal computer (PC), a digital scanner, a digital camera, a printer, headphones, and a pointing device. At least a portion of the service may be performed by an entity accessible via the broadband network, and the service may comprise at least one of: scheduling a meeting, arranging for transportation, and placing a hotel reservation.

Additional aspects of the present invention may be seen in a method for supporting digital personal assistance functionality for a plurality of access devices via a broadband access gateway. A method in accordance with the present invention may comprise collecting, from at least a portion of the plurality of access devices, information describing available multimedia information. The method may also receive a request from one of the plurality of access devices, and the request may identify at least one of: a service to be performed and at least two sources of multimedia information to be used in the performance of the service. The at least two sources of multimedia information may reside on different ones of the plurality of access devices. The method may also comprise initiating the requested service using the identified at least two sources of multimedia information. Multimedia information in a representative embodiment according to the present invention may comprise at least one of: streaming video, broadcast video, voice, digital data, text, digitized audio, digitized still images, digitized video, and digitized music. In addition, the method may comprise exchanging multimedia information among at least one wireless interface and a broadband network. The at least one wireless interface may be compliant with the Bluetooth V1.2 or compatible personal area network (PAN) specification, may communicate using an unlicensed frequency band, and may communicate at a frequency of approximately 2.4 gigahertz. In a representative embodiment of the present invention, the at least one wireless interface may be compliant with at least one of: the Institute of Electrical and Electronics Engineers (IEEE) 802.11a, 802.11b, 802.11g, and 802.11n standards.

In various representative embodiments of the present invention, the broadband network may comprise at least one of: a digital subscriber line (DSL) network, a cable network, a satellite network, a cellular network, and the Internet. The cellular network may comprise at least one of: a global system for mobile communications (GSM) network, a time division multiple access (TDMA) network, a code division multiple access (CDMA) network, and a universal mobile telecommunications system (UMTS) network. A representative embodiment according to the present invention may also comprise receiving from at least one of the plurality of access devices, at least one of: information identifying an access device and information identifying a user. The information identifying an access device may comprise at least one of: an electronic serial number, an Internet protocol (IP) address, a media access control (MAC) address, a directory number, an International Mobile Station Identifier (IMSI) address, a Mobile Identification Number (MIN) address, information identifying a make of an access device, and information identifying a model of an access device. The information identifying a user may comprise at least one of: a member identifier, a user name, an administrative identifier, and a credit card number. In various representative embodiments of the present invention, the plurality of access devices may comprise at least one of: a mobile multimedia handset, a personal digital assistant (PDA), a personal computer (PC), a digital scanner, a digital camera, a printer, headphones, and a pointing device. At least a portion of the service may be performed by an entity accessible via a broadband network, and the service may comprise at least one of: scheduling a meeting, arranging for transportation, and placing a hotel reservation.

Yet other aspects of the present invention may be observed in a machine-readable storage, having stored thereon a computer program having a plurality of code sections executable by a machine, for causing the machine to perform the operations of the method described above.

Further aspects of the present invention may be observed in a system supporting the identification of social networks of users of a plurality of access devices. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may also be capable of receiving from at least one of the plurality of access devices, information identifying at least one of an access device and a user. In a representative embodiment of the present invention, the gateway may be capable of collecting access statistics based upon the identified at least one of: an access device and a user, and associated accessed multimedia information, and of associating at least a first user and a second user based upon the access statistics and at least one threshold. Multimedia information, in a representative embodiment of the present invention, may comprise at least one of: streaming video, broadcast video, voice, digital data, text, digitized audio, digitized still images, digitized video, and digitized music, and the at least one wireless interface may communicate at a frequency of approximately 2.4 gigahertz.

In various representative embodiments of the present invention, the broadband network may comprise at least one of: a digital subscriber line (DSL) network, a cable network, a satellite network, a cellular network, and the Internet. The information identifying an access device may comprise at least one of: an electronic serial number, an Internet protocol (IP) address, a media access control (MAC) address, a directory number, an International Mobile Station Identifier (IMSI) address, a Mobile Identification Number (MIN) address, information identifying a make of an access device, and information identifying a model of an access device. The information identifying a user may comprise at least one of: a member identifier, a user name, an administrative identifier, and a credit card number. The plurality of access devices may comprise at least one of: a mobile multimedia handset, a personal digital assistant (PDA), a personal computer (PC), a digital scanner, a digital camera, a printer, headphones, and a pointing device, and the associated users may be provided at least one of: services and information, different from a non-associated user.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECS) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting digital personal assistance functionality for a plurality of access devices, the system comprising:

a gateway communicatively coupled to a broadband network and at least one wireless interface, the gateway capable of selectively exchanging multimedia information among the at least one wireless interface and the broadband network, and of communicating with the plurality of access devices via the at least one wireless interface;

the gateway capable of collecting, from at least a portion of the plurality of access devices, information describing available multimedia information;

the gateway capable of receiving a request from one of the plurality of access devices, the request identifying a service to be performed and at least two sources of multimedia information to be used in the performance of the service, the at least two sources of multimedia information residing on different ones of the plurality of access devices; and the gateway capable of initiating the requested service using the identified at least two sources of multimedia information.

2. The system according to claim 1 wherein multimedia information comprises one or more of streaming video, broadcast video, voice, digital data, text, digitized audio, digitized still images, digitized video, and/or digitized music.

3. The system according to claim 1 wherein the at least one wireless interface is compliant with the Bluetooth V1.2 or compatible personal area network (PAN) specification.

4. The system according to claim 1 wherein the at least one wireless interface communicates using an unlicensed frequency band.

5. The system according to claim 1 wherein the at least one wireless interface communicates at a frequency of approximately 2.4 gigahertz.

6. The system according to claim 1 wherein the at least one wireless interface is compliant with one or more of the Institute of Electrical and Electronics Engineers (IEEE) 802.11a, 802.11 b, 802.11 g, and/or 802.11n standards.

7. The system according to claim 1 wherein the broadband network comprises one or more of a digital subscriber line (DSL) network, a cable network, a satellite network, a cellular network, and/or the Internet.

8. The system according to claim 7 wherein the cellular network comprises one or more of a global system for mobile communications (GSM) network, a time division multiple access (TDMA) network, a code division multiple access (CDMA) network, and/or a universal mobile telecommunications system (UMTS) network.

9. The system according to claim 1, further comprising:

the gateway capable of receiving from at least one of the plurality of access devices, one or both of information identifying an access device and/or information identifying a user.

10. The system according to claim 9 wherein the information identifying an access device comprises one or more of an electronic serial number, an Internet protocol (IP) address, a media access control (MAC) address, a directory number, an International Mobile Station Identifier (IMSI) address, a Mobile Identification Number (MIN) address, information identifying a make of an access device, and/or information identifying a model of an access device.

11. The system according to claim 9 wherein the information identifying a user comprises one or more of a member identifier, a user name, an administrative identifier, and/or a credit card number.

12. The system according to claim 1 wherein the plurality of access devices comprises one or more of a mobile multimedia handset, a personal digital assistant (PDA), a personal computer (PC), a digital scanner, a digital camera, a printer, headphones, and/or a pointing device.

13. The system according to claim 1 wherein at least a portion of the service is performed by an entity accessible via the broadband network.

14. The system according to claim 1 wherein the service comprises one or more of scheduling a meeting, arranging for transportation, and/or placing a hotel reservation.

15. A method for supporting digital personal assistance functionality for a plurality of access devices via a broadband access gateway, the method comprising:
   collecting, from at least a portion of the plurality of access devices, information describing available multimedia information;
   receiving a request from one of the plurality of access devices, the request identifying a service to be performed and at least two sources of multimedia information to be used in the performance of the service, the at least two sources of multimedia information residing on different ones of the plurality of access devices; and
   initiating the requested service using the identified at least two sources of multimedia information.

16. The method according to claim 15 wherein multimedia information comprises one or more of streaming video, broadcast video, voice, digital data, text, digitized audio, digitized still images, digitized video, and/or digitized music.

17. The method according to claim 15 further comprising:
   exchanging multimedia information among at least one wireless interface and a broadband network.

18. The method according to claim 17 wherein the at least one wireless interface is compliant with the Bluetooth V1.2 or compatible personal area network (PAN) specification.

19. The method according to claim 17 wherein the at least one wireless interface communicates using an unlicensed frequency band.

20. The method according to claim 17 wherein the at least one wireless interface communicates at a frequency of approximately 2.4 gigahertz.

21. The method according to claim 17 wherein the at least one wireless interface is compliant with one or more of the Institute of Electrical and Electronics Engineers (IEEE) 802.11a, 802.11b, 802.11g, and/or 802.11n standards.

22. The method according to claim 17 wherein the broadband network comprises one or more of a digital subscriber line (DSL) network, a cable network, a satellite network, a cellular network, and/or the Internet.

23. The method according to claim 22 wherein the cellular network comprises one or more of a global system for mobile communications (GSM) network, a time division multiple access (TDMA) network, a code division multiple access (CDMA) network, and/or a universal mobile telecommunications system (UMTS) network.

24. The method according to claim 15, further comprising:
   receiving from at least one of the plurality of access devices, one or both of information identifying an access device and/or information identifying a user.

25. The method according to claim 24 wherein the information identifying an access device comprises one or more of an electronic serial number, an Internet protocol (IP) address, a media access control (MAC) address, a directory number, an International Mobile Station Identifier (IMSI) address, a Mobile Identification Number (MIN) address, information identifying a make of an access device, and/or information identifying a model of an access device.

26. The method according to claim 24 wherein the information identifying a user comprises one or more of a member identifier, a user name, an administrative identifier, and/or a credit card number.

27. The method according to claim 15 wherein the plurality of access devices comprises one or more of a mobile multimedia handset, a personal digital assistant (PDA), a personal computer (PC), a digital scanner, a digital camera, a printer, headphones, and/or a pointing device.

28. The method according to claim 15 wherein at least a portion of the service is performed by an entity accessible via a broadband network.

29. The method according to claim 15 wherein the service comprises one or more of scheduling a meeting, arranging for transportation, and/or placing a hotel reservation.

30. A machine-readable storage, having stored thereon a computer program having a plurality of code sections for operating a gateway supporting digital personal assistance functionality for a plurality of access devices, the code sections executable by a machine for causing the machine to perform the operations comprising:
   collecting, from at least a portion of the plurality of access devices, information describing available multimedia information;
   receiving a request from one of the plurality of access devices, the request identifying a service to be performed and at least two sources of multimedia information to be used in the performance of the service, the at least two sources of multimedia information residing on different ones of the plurality of access devices; and
   initiating the requested service using the identified at least two sources of multimedia information.

31. The non-transitory machine-readable storage according to claim 30 wherein multimedia information comprises one or more of streaming video, broadcast video, voice, digital data, text, digitized audio, digitized still images, digitized video, and/or digitized music.

32. The non-transitory machine-readable storage according to claim 30 wherein the code sections executable by a machine further causing the machine to perform the operations comprising: exchanging multimedia information among at least one wireless interface and a broadband network.

33. The non-transitory machine-readable storage according to claim 32 wherein the at least one wireless interface is compliant with the Bluetooth V1.2 or compatible personal area network (PAN) specification.

34. The non-transitory machine-readable storage according to claim 32 wherein the at least one wireless interface communicates using an unlicensed frequency band.

35. The non-transitory machine-readable storage according to claim 32 wherein the at least one wireless interface communicates at a frequency of approximately 2.4 gigahertz.

36. The non-transitory machine-readable storage according to claim 32 wherein the at least one wireless interface is compliant with one or more of the Institute of Electrical and Electronics Engineers (IEEE) 802.11a, 802.11b, 802.11g, and/or 802.11n standards.

37. The non-transitory machine-readable storage according to claim 32 wherein the broadband network comprises one or more of a digital subscriber line (DSL) network, a cable network, a satellite network, a cellular network, and/or the Internet.

38. The non-transitory machine-readable storage according to claim 37 wherein the cellular network comprises one or more of a global system for mobile communications (GSM) network, a time division multiple access (TDMA) network, a code division multiple access (CDMA) network, and/or a universal mobile telecommunications system (UMTS) network.

39. The non-transitory machine-readable storage according to claim 30 wherein the code sections executable by a machine further causing the machine to perform the operations comprising:
receiving from at least one of the plurality of access devices, one or both of information identifying an access device and/or information identifying a user.

40. The non-transitory machine-readable storage according to claim 39 wherein the information identifying an access device comprises one or more of an electronic serial number, an Internet protocol (IP) address, a media access control (MAC) address, a directory number, an International Mobile Station Identifier (IMSI) address, a Mobile Identification Number (MIN) address, information identifying a make of an access device, and/or information identifying a model of an access device.

41. The non-transitory machine-readable storage according to claim 39 wherein the information identifying a user comprises one or more of a member identifier, a user name, an administrative identifier, and/or a credit card number.

42. The non-transitory machine-readable storage according to claim 30 wherein the plurality of access devices comprises one or more of a cellular phone, a personal digital assistant (PDA), a personal computer (PC), a digital scanner, a digital camera, a printer, headphones, and/or a pointing device.

43. The non-transitory machine-readable storage according to claim 30 wherein at least a portion of the service is performed by an entity accessible via a broadband network.

44. The non-transitory machine-readable storage according to claim 30 wherein the service comprises one or more of scheduling a meeting, arranging for transportation, and/or placing a hotel reservation.

45. A system supporting the identification of social networks of users of a plurality of access devices, the system comprising:
a gateway communicatively coupled to a broadband network and at least one wireless interface, the gateway capable of selectively exchanging multimedia information among the at least one wireless interface and the broadband network, and of communicating with the plurality of access devices via the at least one wireless interface;
the gateway capable of receiving from at least one of the plurality of access devices, information identifying one or both of an access device and/or a user;
the gateway capable of collecting access statistics based upon the identified one or both of an access device and/or a user, and associated accessed multimedia information, wherein the access statistics comprise duration of access or usage, demographics of users accessing multimedia information and services, and one or both of a number of accesses and/or accesses per unit time; and
the gateway capable of associating at least a first user and a second user based upon the access statistics and at least one threshold.

46. The system according to claim 45 wherein multimedia information comprises one or more of streaming video, broadcast video, voice, digital data, text, digitized audio, digitized still images, digitized video, and/or digitized music.

47. The system according to claim 45 wherein the at least one wireless interface communicates at a frequency of approximately 2.4 gigahertz.

48. The system according to claim 45 wherein the broadband network comprises one or more of a digital subscriber line (DSL) network, a cable network, a satellite network, a cellular network, and/or the Internet.

49. The system according to claim 45 wherein the information identifying an access device comprises one or more of an electronic serial number, an Internet protocol (IP) address, a media access control (MAC) address, a directory number, an International Mobile Station Identifier (IMSI) address, a Mobile Identification Number (MIN) address, information identifying a make of an access device, and/or information identifying a model of an access device.

50. The system according to claim 45 wherein the information identifying a user comprises one or more of a member identifier, a user name, an administrative identifier, and/or a credit card number.

51. The system according to claim 45 wherein the plurality of access devices comprises one or more of a mobile multimedia handset, a personal digital assistant (PDA), a personal computer (PC), a digital scanner, a digital camera, a printer, headphones, and/or a pointing device.

52. The system according to claim 45 wherein the associated users are provided one or both of services and/or information, different from a non-associated user.

* * * * *